(12) United States Patent
Douglas

(10) Patent No.: US 8,437,922 B2
(45) Date of Patent: May 7, 2013

(54) SYSTEMS AND METHODS FOR DETECTION OF PISTON PUMP FAILURES ON MOBILE MACHINES

(75) Inventor: Richard D. Douglas, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 332 days.

(21) Appl. No.: 12/967,934

(22) Filed: Dec. 14, 2010

(65) Prior Publication Data

US 2012/0150383 A1 Jun. 14, 2012

(51) Int. Cl.
*G06F 7/70* (2006.01)

(52) U.S. Cl.
USPC .......................................................... 701/50

(58) Field of Classification Search .................. 701/50; 327/427, 536, 437, 432; 330/277, 297, 296, 330/269; 62/285, 515, 256
See application file for complete search history.

(56) References Cited

U.S. PATENT DOCUMENTS

| | | |
|---|---|---|
| 5,563,351 A | 10/1996 | Miller |
| 5,748,077 A | 5/1998 | Brandt |
| 5,918,268 A | 6/1999 | Lukas et al. |
| 6,055,851 A | 5/2000 | Tanaka et al. |
| 6,092,370 A | 7/2000 | Tremoulet, Jr. et al. |
| 6,882,960 B2 | 4/2005 | Miller |
| 7,013,223 B1 | 3/2006 | Zhang et al. |
| 7,082,758 B2 | 8/2006 | Kageyama et al. |
| 7,623,986 B2 | 11/2009 | Miller |
| 7,689,368 B2 | 3/2010 | Douglas |
| 7,693,684 B2 | 4/2010 | Halbinger et al. |
| 2009/0229456 A1 | 9/2009 | Kunze et al. |

FOREIGN PATENT DOCUMENTS

JP 10326109 12/1998

*Primary Examiner* — Thomas Black
*Assistant Examiner* — Luke Huynh

(57) ABSTRACT

A method and system for monitoring and predicting failure in pumps on operating vehicles is disclosed. The method may comprise measuring a plurality of a pressure drops across an orifice in a case drain line of a vehicle operating in drive gear, determining an actual case drain flow rate for each measured pressure drop, selecting a plurality of the actual case drain flow rates, estimating for each selected actual case drain flow rate an estimated flow rate for the case drain line and displaying the difference between the actual case drain flow rate and the estimated flow rate for each selected actual case drain flow rate.

20 Claims, 4 Drawing Sheets

SYSTEMS AND METHODS FOR DETECTION OF PISTON PUMP FAILURES ON MOBILE MACHINES

TECHNICAL FIELD

The present disclosure generally relates to systems and methods for monitoring pumps on earth moving, construction and mining vehicles and, more particularly, relates to predicting pump failure in such vehicles.

BACKGROUND

The implement hydraulic systems on earth moving, construction and mining vehicles generally use multiple variable and fixed displacement piston hydraulic pumps. For example, on a wheel loader during bucket lift, nearly all flow from implement pumps is directed to the lift cylinders to raise the bucket. These hydraulic piston pumps provide the power to move the implements on such vehicles. In the event of a catastrophic pump failure, debris from the failure may enter the implement hydraulic system and contaminate the system valves, cylinders and lines. Debris may also migrate back to the hydraulic tank and reenter the implement pumps, initiating subsequent pump failures. Many vehicles do not use full-flow return filtration due to very high cyclical return flow rates, the large filter size required to handle the large flow rates, and subsequent higher ongoing filter maintenance cost. Pumps on many vehicles generally do not use inlet filters or screens due to the potential for (a) cavitation damage from the inlet pressure drop caused by partially restricted filters or screens and (b) the ingestion of plugged screens or filters by the pump, which may result in instant catastrophic pump failure.

A catastrophic pump failure requires significant system disassembly for debris removal and cleaning to reduce the probability of additional pump failures caused by debris in the system. These failures are very expensive in terms of repair costs and machine downtime. The only way to prevent a catastrophic pump failure is to detect a pump that is starting to fail and to replace it.

However, knowing when a pump is starting to fail is very difficult to detect in a system with multiple pumps. There is currently no method of detecting pump failure during normal machine operation. The only available methods to measure pump performance require the machine to be stopped and test equipment to be installed in the machine. One such method involves the installation of a flow meter and the measurement, while the machine is being serviced, of pump outlet flow under maximum pressure conditions. This method is rarely used because the necessary test equipment is large and labor intensive to install and remove. A second method involves the performance of a case drain (bucket test) during machine servicing. This test measures leakage flow from the pump case back to the tank with the pump in a maximum pressure stall condition. However, because hydraulic piston pumps may go from normal operation to failure in a matter of hours, the probability of finding a pump that is about to fail is very remote with either of these methods.

If impending pump failure could be detected early, the pump could quickly and easily be replaced without contaminating the system and causing significant downtime. This would result in a significant reduction in warranty costs, repair-hours and machine downtime, while improving machine reliability and availability.

SUMMARY OF THE DISCLOSURE

In accordance with one aspect of the disclosure, a method of monitoring pumps is disclosed. The method may comprise measuring a plurality of pressure drops across an orifice in a case drain line of a vehicle operating in drive gear, determining an actual case drain flow rate for each measured pressure drop, selecting a plurality of the actual case drain flow rates, estimating for each selected actual case drain flow rate an estimated flow rate for the case drain line and displaying the difference between the actual case drain flow rate and the estimated flow rate for each selected actual case drain flow rate.

In accordance with another aspect of the disclosure, a method of predicting pump failure in a vehicle is disclosed. The method may comprise determining a plurality of actual case drain flow rates, selecting a plurality of the actual case drain flow rates, estimating for each selected actual case drain flow rate an estimated flow rate for the case drain line, and displaying an incident flag if the difference between the actual case drain flow rate and the estimated flow rate exceeds a threshold. Each actual case drain flow rate may be determined based on the pressure drop measured across an orifice of a case drain line in a vehicle operating in drive gear.

In accordance with a further aspect of the disclosure, a method of predicting pump failure in a vehicle is disclosed. The method may comprise measuring, at about the same time, a pressure drop across an orifice in a case drain line and a set of operational parameters while the vehicle is operating, repeating the measuring step at the expiration of an increment of time in the range of greater than zero to about 3600 seconds, determining an actual case drain flow rate for each measured pressure drop, selecting a plurality of the actual case drain flow rates for the vehicle, estimating for each selected actual case drain flow rate an estimated flow rate for the case drain line, and displaying a first trend for the actual case drain flow rate and a second trend for the estimated case drain flow rate.

In accordance with a further aspect of the disclosure, a system is disclosed for monitoring a hydraulic pump while a vehicle is in drive gear. The vehicle may include a hydraulic pump connected to a hydraulic tank by a case drain line. The system may comprise a case drain assembly disposed in the case drain line between the pump and the tank. The case drain assembly may include an orifice member defining an orifice, a fluid chamber configured to receive fluid from the pump, and a channel configured to receive fluid from the fluid chamber through the orifice. The orifice member may be disposed in the case drain assembly between the fluid chamber and the channel. The system may further comprise a sensor connected to the fluid chamber and the channel, the sensor configured to periodically measure a differential pressure across the orifice, and a processor configured to receive the measured differential pressure and to calculate an actual flow rate for each measured differential pressure received, and an user interface configured to display a trend comprising a plurality of the calculated actual flow rates.

These and other aspects of this disclosure will become more readily apparent upon reading the following detailed description when taken into conjunction with the following drawings.

Figure 1:
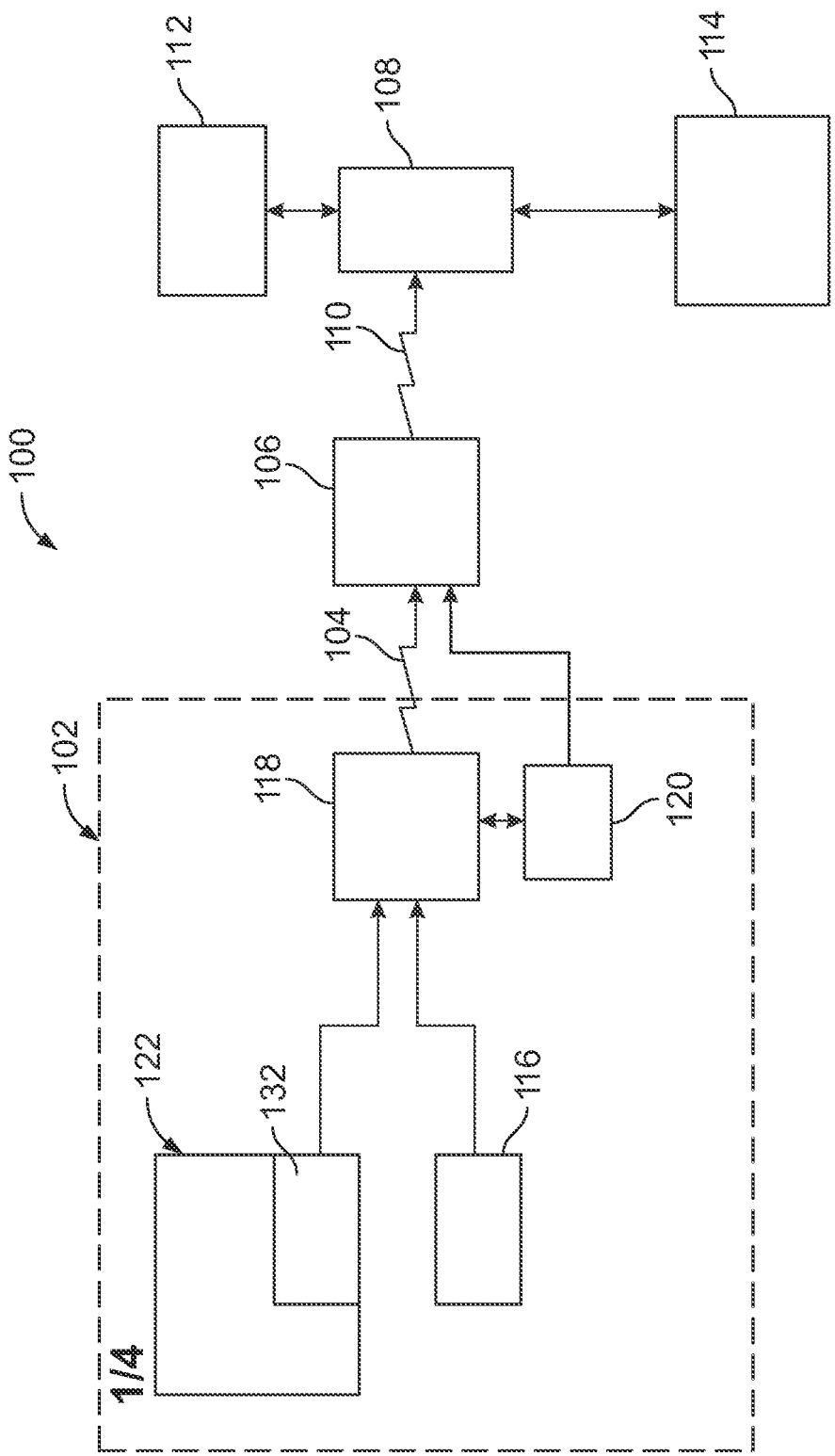
FIG. 1 is a schematic of an embodiment of a system for monitoring pumps in an operating vehicle.

While the present disclosure is susceptible to various modifications in alternative constructions, certain illustrative embodiments thereof have been shown in the drawings and will be described below in more detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

FIG. 1 illustrates an exemplary system 100 for monitoring pumps in hydraulic vehicles and for predicting pump failure in such vehicles.

In the exemplary system 100 depicted in FIG. 1, the monitoring system 100 may comprise a vehicle system 102 connected by a first communication link 104 to a first server 106, a monitoring processor 108 connected via a second communication link 110 to the first server 106, and a monitoring database 112 connected to the monitoring processor 108.

The first server 106 may be file server disposed remotely from the vehicle system 102. In the embodiment in FIG. 1, the first communication link 104 is a cell based link. However, the communication link 104 is not limited to a cell based link, but in alternative embodiments may be an RF link or other appropriate communication link as is known in the art to transfer vehicle data may be used.

The second communication link 110 may be the internet or any other type of appropriate communication network across which vehicle data may be received by the monitoring processor 108. In some embodiments, vehicle data may flow directly from the vehicle system to the monitoring processor 108 across an appropriate communication link. The monitoring system 100 may further comprise a user interface 114 connected to the monitoring processor 108.

The vehicle system 102 may comprise a plurality of machine sensors 116, a processor 118, a machine database 120 connected to the processor 118, and a case drain assembly 122. The case drain assembly 122 may include a differential pressure sensor 132. The processor 118 may be connected to the machine sensors 116 and may receive from the plurality of machine sensors 116 measured operational readings. The processor 118 may also be connected to and receive readings from the differential pressure sensor 132.

Figure 2:
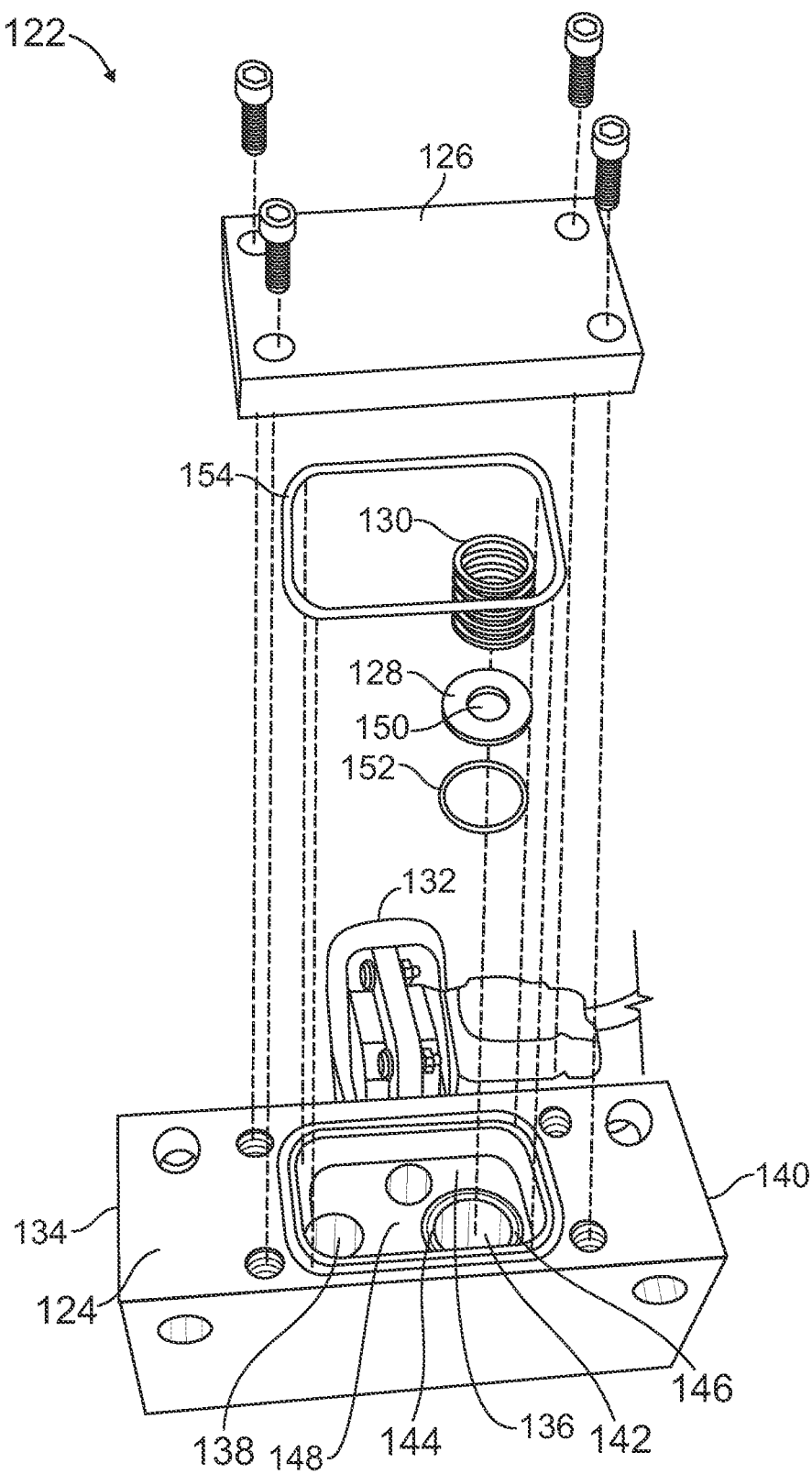
FIG. 2 is an exploded view of the case drain assembly.

FIG. 2 illustrates an embodiment of the case drain assembly 122. The case drain assembly may comprise a body 124, a cover 126 attached to the body 124, an orifice member 128, a resilient member 130, and a differential pressure sensor 132.

The body 124 of the case drain assembly 122 includes an entrance port 134, a fluid chamber 136 connected to the entrance port 134 by an inlet channel 138, and an exit port 140 connected to the fluid chamber 136 by an outlet channel 142. The outlet channel 142 includes a mouth 144 disposed at the intersection of the outlet channel 142 and the fluid chamber 136. The fluid chamber 136 defines an opening 148 in the body 124 and may define a recess 146 in a wall of the fluid chamber 136. In the embodiment shown in FIG. 2, the recess 146 is an annular recess. In other embodiments the recess 146 may take other shapes.

The orifice member 128 defines an orifice 150. In one embodiment the orifice member 128 may be an annular plate defining an annular orifice 150. In other embodiments, other geometries may be utilized. The orifice member 128 may be disposed in the recess 146 over the mouth 144 of the outlet channel 142. The orifice 150 may be sized for each pump to be monitored so that the case drain restriction through the orifice 150 will be between about 5 to about 8 pounds per square inch (psi) for each pump. This pressure range will provide a differential pressure large enough to reliably measure, but small enough to prevent damage to pump seals. An O-ring seal 152 may be disposed between the orifice member 128 and the recess 146 to provide a more secure seal between the orifice member 128 and the recess 146 of the fluid chamber 136.

When the case drain assembly 122 is assembled, the cover 126 may be disposed across the fluid chamber opening 148 and fastened to the body by bolts or other fastening means as may be known in the art. A body O-ring 154 may be disposed between the cover and the body to provide a more secure sealing interface between the cover 126 and the body 124. The orifice member 128 may be retained by a resilient member 130 disposed between the cover 126 and the orifice member 128 when the case drain assembly is assembled. In an embodiment, the resilient member 130 may be a spring.

Figure 3:
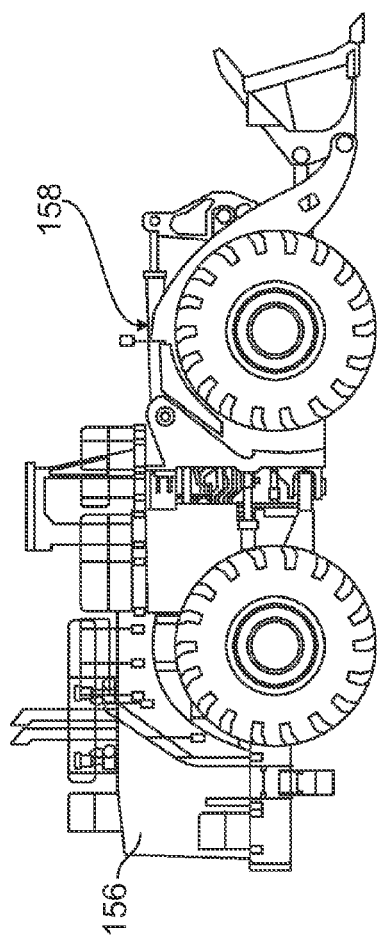
FIG. 3 is an elevation view of an exemplary vehicle having hydraulic pumps that may be monitored in accordance with the teachings of this disclosure.
Figure 4:
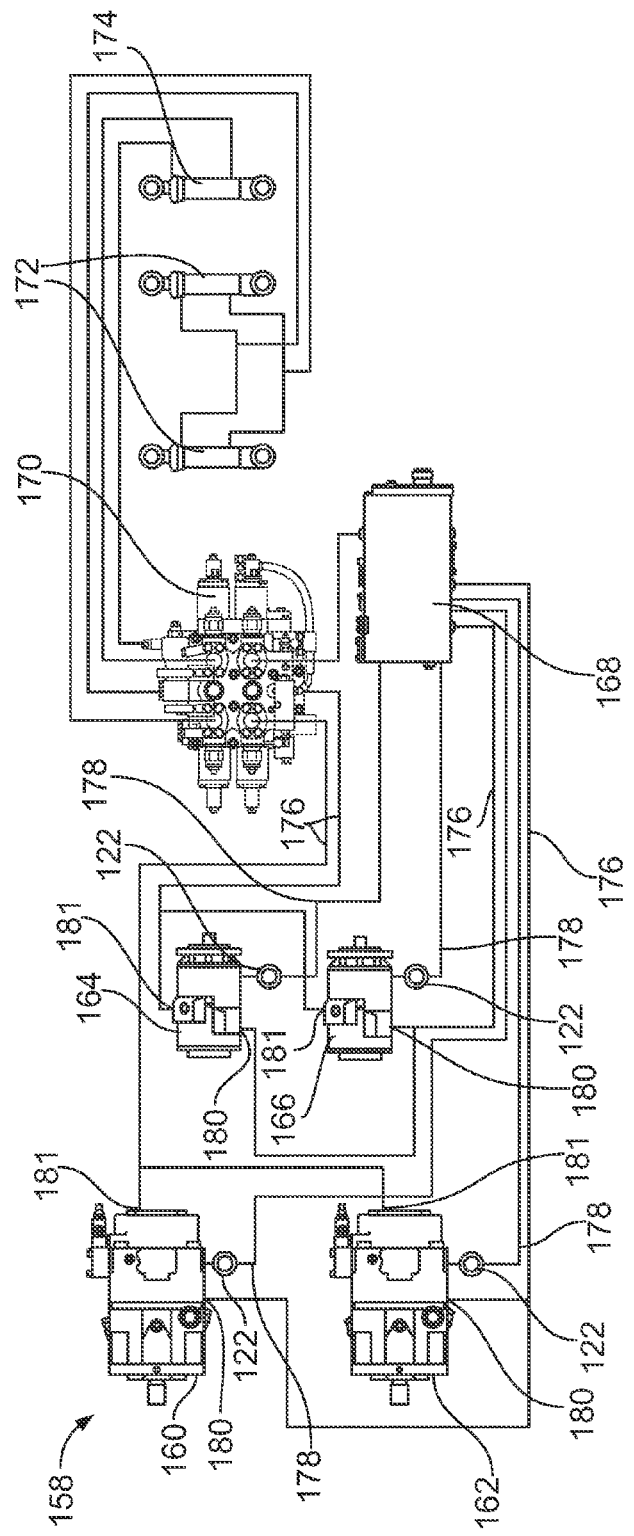
FIG. 4 is a schematic of an embodiment of the hydraulic system of the exemplary vehicle of FIG. 3.

FIGS. 3-4 illustrate a vehicle 156, the hydraulic system 158 of the vehicle 156, and more specifically, the vehicle pumps that may be monitored by the monitoring system 100 of the present disclosure. While in this particular example the vehicle 156 is a wheel loader, the monitoring system 100 may be utilized with any type of vehicle 156 having one or more pumps.

As illustrated in FIGS. 3-4, the exemplary hydraulic system 158 for the exemplary vehicle 156 may comprise a first pump 160, a second pump 162, a third pump 164, a fourth pump 166, a hydraulic tank 168, a control valve 170, a plurality of lift cylinders 172, a tilt cylinder 174, fluid lines 176, and case drain lines 178. In an embodiment, the first and second pumps 160, 162 may be variable displacement implement pumps and the third and fourth pumps 164, 166 may be fixed displacement implement pumps. Hydraulic fluid may flow from the hydraulic tank 168 through the fluid lines 176 to the inlet port 180 of each of the first, second, third and fourth pumps 160-166. Hydraulic fluid may flow from the outlet port 181 of each of the pumps 160-166 through the fluid lines 176 to the control valve 170 and from there to the cylinders 170-174 that control the lifting/tilting of the attachment. Hydraulic fluid may flow through the fluid lines 176 back to the control valve 170 from each of the cylinders 170-174 and then return to the hydraulic tank 168. Each pump 160-166 may also be connected to a case drain line 178 leading back to the hydraulic tank 168. During vehicle 156 operation, leakage of hydraulic fluid from each pump 160-166 during operation may flow back to the hydraulic tank 168 through the respective case drain line 178.

Under normal conditions, pumps may leak a relatively small amount of hydraulic fluid into the case drain line 178. In some embodiments, but not all embodiments, the pumps may operate at pressures up to about 4,750 psi and may provide high pressure flow rates of up to about 145 gallons per minute (gpm). The return-to-tank flow rates while lowering the bucket may reach about 1,100 gpm or more. The normal leakage into the case drain lines 178 for these particular pumps may fluctuate from about 0 to about 4 gpm depending on the outlet pressure for each pump 160-166. In other configurations and embodiments, the pump size and output flow may be different and a greater or lesser amount of leakage may be typical or normal. A pump's outlet pressure is a measurement of the pressure of the hydraulic fluid flowing in the fluid line 176 leading from the pump's outlet port 181. The measurement may be taken at or around the pump's outlet port 181 or, in some cases, in the fluid line 172 proximal to the lift cylinders 176.

As pumps start to fail, there often may be an increase in the pump leakage through the case drain line 178. The increase may be sudden or may be gradual. Thus, a trend of abnormally high flow leakage into the case drain line 178 is a good indicator of impending pump failure. However, because the case drain flow rate varies for a pump dramatically during the loading and unloading cycles of normal operation of the vehicle 156, it is beneficial to use case drain flow rates measured during high pressure operating conditions for the vehicle 156 to determine whether a trend of abnormally high case drain flow leakage exists.

In the monitoring system 100 of the present disclosure, the hydraulic system 158 may include (for each pump 160-166) a case drain assembly 122 placed in the case drain line 178 in series between each pump 160-166 and the hydraulic tank 168. The hydraulic fluid may flow from the pump 160-166 into the case drain line 178 and into the entrance port 134 of the body 124 of the case drain assembly 122. The fluid may flow from the entrance port 134 through the inlet channel 138 into the fluid chamber 136. From the fluid chamber 136, the fluid may flow through the orifice 150 (in the orifice member 128) into the outlet channel 142 and out of the body 124 through the exit port 140 into the case drain line 178. Once back in the case drain line 178, the fluid may flow to the hydraulic tank 168.

The case drain assembly 122 creates a relatively small pressure drop across (on either side of) the orifice 150. The differential pressure sensor 132 of the case drain assembly 122 measures the differential pressure in the case drain line 178 leading from each pump 160-166 by measuring the change in pressure across the orifice 150 (the change in pressure from the front side of the orifice to the back side of the orifice). The differential pressure sensor 132 expresses the change in pressure as a voltage between about 0 and about 5 volts DC and sends the voltage reading to the processor 118 (see FIG. 1). In the embodiment illustrated in FIG. 1, the processor 118 is on-board the vehicle 156. In other embodiments, the processor 118 (and/or the machine database 120 connected to it may be remote from the vehicle 156).

At about the same time that such differential pressure reading is taken, measurements (referred to herein as "measured operational readings") may also be taken by the plurality of machine sensors 116 disposed on the vehicle 156. Such measured operational readings may include, but are not limited to, the transmission speed, the ground speed of the vehicle, the torque converter pedal position, the pump outlet pressure, the variable displacement of the implement solenoid, the engine load, and the oil temperature.

Each time the differential pressure is measured in a case drain line 178, the processor 118 may receive from the differential pressure sensor 132 a signal voltage representing the differential pressure reading and, from the machine sensors 116, measured operational readings. The processor 118 may store these readings on the machine database 120 connected to the processor 118.

In some embodiments, a differential pressure reading may be taken about once a second. In other embodiments, the time interval between readings may be more frequent than once a second. In still other embodiments, the time interval may less frequent, such as about once a minute, or about once an hour or about once a day.

The differential pressure readings for each pump 160-166 and the measured operational readings (collectively "vehicle data") may be transmitted from the processor 118 to a server 106 over a communication link 104. The transmittal from the processor 118 to the server 106 may occur several times a day or may be more or less frequent. In the embodiment illustrated in FIG. 1, the vehicle data may be then sent over a communication link 110 to another processor 108 for processing, analysis and storage on a database 112.

In an embodiment, the monitoring processor 108 may convert each electric signal voltage representing a reading from a differential pressure sensor 132 to an actual case drain flow rate and may store each converted value in the monitoring database 112. The actual case drain flow rate may be calculated, as is known in the art, utilizing the differential pressure across a known size orifice 150. Thus, since the size of the orifice 150 in each case drain assembly is known, an actual case drain flow rate may be calculated (for each pump 160-166) based on the differential pressure across the orifice 150 in the case drain assembly associated with each pump 160-166. In alternative embodiments, this calculation may be done, instead, by processor 118.

In addition, in some embodiments, the monitoring processor 108 may calculate operational values from some of the measured operational readings. One example of an operational value that may be calculated is the fuel injection rate of the vehicle engine.

The monitoring processor 108 may associate the measured operational readings and/or the calculated operational values (collectively "operational parameters") that occurred in conjunction (or at about the same time as the differential pressure reading) with the actual case drain flow rate determined for each pump 160-166. The operational parameters and the actual case drain flow rate for each pump 160-166 may be stored on the monitoring database 112.

The monitoring processor 108 may select a plurality of the actual case drain flow rates for use in creating a trend of actual case drain flow rates for each individual monitored pump 160-166. In one embodiment, the actual trend for a particular pump may comprise case drain flow rates associated with the top 10% of the pump operating pressures gathered over a measurement period in which the vehicle 156 is working on a job that required the loading of material "loading conditions." The top 10% of pump operating pressures may be those that are in the ninetieth or above percentile for a given group of pump operating pressures. The measurement period may be a period of time or may represent a grouping or batch of measurements taken. Typically case drain flow rates selected using this criteria are the case drain flow rates that occur while digging, or more particularly, breaking the load out of a pile.

In another embodiment, the actual case drain flow rates may be filtered by the processor 108 to select (for each monitored pump 160-166) actual case drain flow rates that occurred when a certain operational parameter was within a certain range of values or at/above a certain threshold. Operational parameters that may be used to select the actual case drain flow rates may include, but are not limited to, the transmission speed, the ground speed of the vehicle, the fuel injection rate of the vehicle engine, the torque converter pedal position, the lift cylinder hydraulic pressure, pump outlet pressure, the variable displacement of the implement solenoid, the engine load, and the oil temperature.

For example, actual flow rates may be selected that occurred when the transmission speed of the vehicle 156 was in first drive gear through the highest drive gear "Z" on the vehicle. Another selection criteria may be the actual flow rates that occurred when the ground speed was more than zero to about 6.5 kilometers per hour. In another embodiment, actual case drain flow rates may be selected in conjunction with an engine fuel consumption rate of 75% or more of maximum rated power.

Another selection criteria may be the actual case drain flow rates that occurred when the hydraulic pressure in the lift cylinders was greater than a value that indicates that the machine was lifting a heavy load. This value may change with the size of machine, size of the hydraulic cylinder or payload.

Yet another selection criteria may be actual flow rates that occurred when the hydraulic pressure in each fixed displacement implement pump was greater than about 20,000 kPa. The torque converter pedal position may also be used as a selection criteria. For example, the monitoring processor 108 may select actual case drain flow rates that occurred when the torque converter pedal was not depressed. Alternatively, the processor may select actual case drain flow rates that occurred when the torque converter pedal was depressed in the range of about 1% to about 45%, or, in yet another alternative embodiment, when the torque converter pedal was depressed in the range of about 45% to about 100%. Another selection criteria may be the actual case drain flow rates occurring when the engine load was in the range of about 60% to 100%.

In some embodiments, a combination of various operational parameters (a "set of operational parameters") may be used as selection criteria. For example, in an embodiment, the selection criteria may be case drain flow rates that occurred when the transmission speed of the vehicle was first drive gear or higher and the hydraulic pressure in the lift cylinders was greater than about 20,000 kPa.

The monitoring processor 108 may estimate for each selected actual case drain flow rate a comparable estimated flow rate for the case drain line 178 under the same or a similar set of operational parameters as those associated with the actual case drain flow rate. The monitoring processor 108 then may compare the estimated case drain flow rate with the actual measured flow rate. If the actual case drain flow rate is greater than the estimated flow rate by a threshold percentage, the monitoring processor 108 may flag the current performance as a deviating beyond normal parameters. In some embodiments, the estimated flow rate may be calculated based on the last 2-3 weeks of vehicle data. In other embodiments, the vehicle data used to generate the estimated flow rate may be from a longer or shorter time frame.

A comparison between such selected actual flow rates and the estimated flow rates may be output. The output 182 may be to a user interface 114, a printer or other display device. The output 182 may include, but is not limited to, a display of an actual trend 184 and an estimated trend 186. The actual trend 184 may depict the selected actual case drain flow rate values for a pump and the estimated trend 186 may depict the comparable estimated flow rate values for the same pump.

Figure 5:
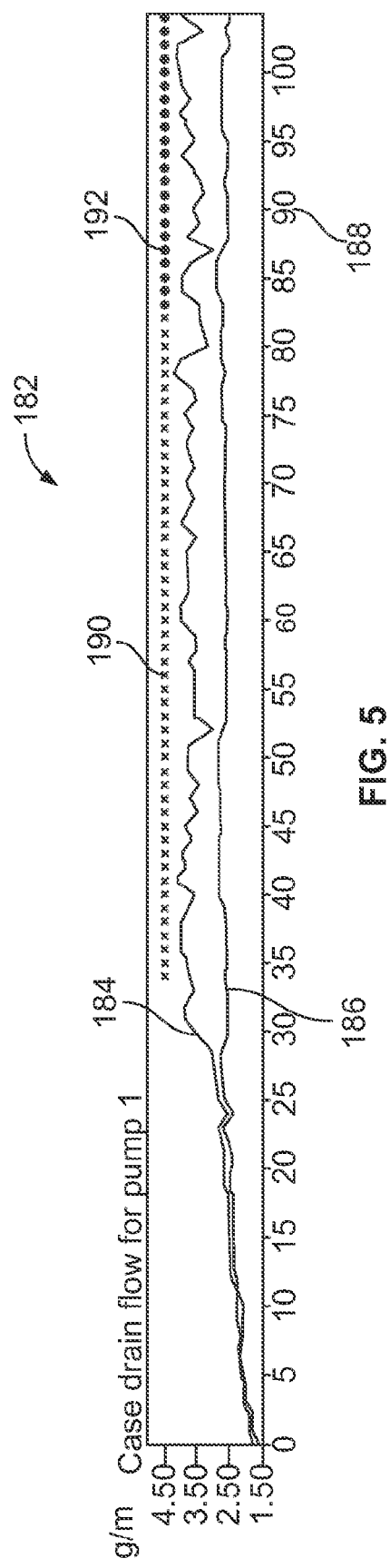
FIG. 5 is an exemplary output from the monitoring system.

FIG. 5 illustrates an exemplary output 182. FIG. 5 shows for a first pump 160 an actual trend 184 for the selected actual case drain flow rates and an estimated trend 186 for the comparable estimated flow rates. The numbers across the Y-axis are data points. A data point may represent each time a pair of values, the selected actual value and the corresponding estimated value, are charted on the output. In this embodiment, the output 182 illustrates the actual and estimated trends 184, 186 over about a hundred data points 188.

The output 182 may also include an incident flag 190 as a warning for an "incident." An incident may occur at a data point 188 when the actual trend 184 varies from the estimated trend 186 by more than a threshold amount or percentage. The threshold may be customized for the pump being monitored. For example, the threshold may be defined based on the type, size or age of the monitored pump.

In an exemplary output illustrated in FIG. 4, the incident is flagged by the "X" appearing above the each data point 188 where the difference between the actual and the estimated is greater than the threshold amount or percentage. In an embodiment of the output, an "X" that is shown above the actual trend line may indicate that the incident was caused by an actual value that was higher than the comparable estimated value for that data point 188. An "X" that is below the actual line may indicate that the incident was cause by an actual value that was lower than the estimated value.

The output may further include an alert indicator 192. An alert indicator 192 may be generated when a certain percentage or number of data points 188 have generated an incident flag 190. For example, if the last forty out of fifty data points 188 generated an incident, an alert indicator may be generated and appear on the output 182. In another example, an alert indicator 192 may be generated when a certain number of sequential data points 188 trigger an incident. For example, an alert indicator 192 may be generated if the last forty sequential data points 188 generated an incident flag 190.

In an embodiment, an alert indictor 192 is a diamond shape, although other shapes or symbols may be used. The monitoring system 100 may also generate other warnings in the event that an alert or incident is triggered. Warning messages may be sent via e-mail, phone or otherwise to notify appropriate personnel of the incident, alert or impending pump failure.

Industrial Applicability

In general, the present disclosure may find applicability in predicting pump failure in a vehicle. The method disclosed herein may comprise measuring a plurality of pressure drops across an orifice in a case drain line of a vehicle operating in drive gear, determining an actual case drain flow rate for each measured pressure drop, determining an estimated flow rate for selected actual case drain flow rates, and displaying a warning indicator if the difference between the actual case drain flow rate and the estimated flow rate exceeds a threshold. This method of predicting pump failure may be beneficial in the industrial setting because it detects pump failure before it occurs. Implementation of this method may result in significant reductions in warranty repair dollars and machine downtime and improve machine reliability.

What is claimed is:

1. A method of monitoring pumps, the method comprising:
   measuring a plurality of a pressure drops across an orifice in a case drain line of a vehicle operating in drive gear;
   determining an actual case drain flow rate for each measured pressure drop;
   selecting a plurality of the actual case drain flow rates;
   estimating for each selected actual case drain flow rate an estimated flow rate for the case drain line; and
   displaying the difference between the actual case drain flow rate and the estimated flow rate for each selected actual case drain flow rate.

2. The method according to claim 1, wherein the plurality of actual case drain flow rates are selected based on an operational parameter associated with each actual case drain flow rate.

3. The method according to claim 2, wherein the operational parameter is pump operating pressure.

4. The method according to claim 1, wherein the actual case drain flow rates selected are associated with pump operating pressures that are approximately equal to or greater than the $90^{th}$ percentile of pump operating pressures obtained during a measurement period.

5. The method according to claim 1, wherein the plurality of actual case drain flow rates are selected based on a set of operational parameters associated with each actual case drain flow rate.

6. The method according to claim 5, wherein the set of vehicle operational parameters includes pump operating pressure and engine fuel consumption rate.

7. The method according to claim 1, wherein the estimated flow rate is based, at least in part, on a set of operational parameters associated with the selected actual case drain flow rate.

8. The method according to claim 1, wherein the measuring step occurs at the expiration of a time interval in the range of greater than zero to about once a day.

9. The method according to claim 1, wherein the measuring step occurs at the expiration of a time interval in the range of greater than zero to about once a minute.

10. A method of predicting pump failure in a vehicle, the method comprising:
   determining a plurality of actual case drain flow rates, each actual case drain flow rate determined based on a pressure drop measured across an orifice of a case drain line in a vehicle operating in drive gear;
   selecting a plurality of the actual case drain flow rates;
   estimating for each selected actual case drain flow rate an estimated flow rate for the case drain line; and
   displaying an incident flag if the difference between the actual case drain flow rate and the estimated flow rate exceeds a threshold.

11. The method according to claim 10, further comprising receiving measured operational readings and associating each of the measured operational readings with one of the plurality of actual case drain flow rates.

12. The method according to claim 10, wherein the plurality of actual case drain flow rates are selected based on an operational parameter associated with each actual case drain flow rate.

13. The method according to claim 10 further comprising displaying an alert if the incident flag is generated for consecutive datapoints.

14. The method according to claim 10 further comprising displaying an alert when the quantity of incident flags for a set of datapoints is above a threshold.

15. A method of predicting pump failure in a vehicle, the method comprising:
   measuring, at about the same time, a pressure drop across an orifice in a case drain line and a set of operational parameters while the vehicle is operating;
   repeating the measuring step at the expiration of an increment of time in the range of greater than zero to about 3600 seconds;
   determining an actual case drain flow rate for each measured pressure drop;
   selecting a plurality of the actual case drain flow rates for the vehicle;
   estimating for each selected actual case drain flow rate an estimated flow rate for the case drain line; and
   displaying a first trend of actual case drain flow rates and a second trend of estimated case drain flow rates.

16. The method according to claim 15 further comprising flagging trends that deviate above a threshold from the expected pump flow rate.

17. The method according to claim 15, wherein the plurality of the actual case drain flow rates are selected based on an operational parameter measured at about the same time as the pressure drop from which each case drain flow rate is determined.

18. The method according to claim 17, wherein the operational parameter is the pump operating pressure in about the ninetieth percentile or greater.

19. The method according to claim 18, wherein each estimated flow rate is derived based at least in part on pump operating pressure.

20. A system for monitoring a hydraulic pump while a vehicle is in drive gear, the vehicle including a hydraulic pump connected to a hydraulic tank by a case drain line, the system comprising:
   a case drain assembly disposed in the case drain line between the pump and the tank, the case drain assembly including an orifice member defining an orifice, a fluid chamber configured to receive fluid from the pump, a channel configured to receive fluid from the fluid chamber through the orifice, and a sensor configured to periodically measure a differential pressure across the orifice, the orifice member disposed in the case drain assembly between the fluid chamber and the channel;
   a processor configured to receive the measured differential pressure and to calculate an actual flow rate for each measured differential pressure received; and
   an user interface configured to display a trend comprising a plurality of the calculated actual flow rates.

* * * * *